US011279411B2

(12) United States Patent
Yamazaki et al.

(10) Patent No.: US 11,279,411 B2
(45) Date of Patent: Mar. 22, 2022

(54) VEHICLE SIDE BODY STRUCTURE

(71) Applicant: Mazda Motor Corporation, Hiroshima (JP)

(72) Inventors: Tadashi Yamazaki, Hiroshima (JP); Takeshi Nakamura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 120 days.

(21) Appl. No.: 16/811,174

(22) Filed: Mar. 6, 2020

(65) Prior Publication Data

US 2020/0398897 A1  Dec. 24, 2020

(30) Foreign Application Priority Data

Jun. 18, 2019  (JP) .............................. JP2019-112694

(51) Int. Cl.
*B62D 21/15* (2006.01)
*B62D 25/04* (2006.01)
*B62D 25/02* (2006.01)
*B60J 5/04* (2006.01)

(52) U.S. Cl.
CPC .......... *B62D 21/157* (2013.01); *B60J 5/0429* (2013.01); *B60J 5/0455* (2013.01); *B62D 25/025* (2013.01); *B62D 25/04* (2013.01)

(58) Field of Classification Search
CPC .... B62D 21/157; B62D 25/025; B62D 25/04; B60J 5/0429; B60J 5/0455
See application file for complete search history.

(56) References Cited

U.S. PATENT DOCUMENTS

2017/0313358 A1\* 11/2017 Narahara ............. B62D 25/025

FOREIGN PATENT DOCUMENTS

| JP | 2009173142 A | 8/2009 |
|---|---|---|
| JP | 2018118697 A | 8/2018 |

OTHER PUBLICATIONS

European Patent Office, Extended European Search Report Issued in Application No. 20162592.8, Sep. 22, 2020, Germany, 7 pages.

\* cited by examiner

*Primary Examiner* — D Glenn Dayoan
*Assistant Examiner* — Melissa Ann Bonifazi
(74) *Attorney, Agent, or Firm* — Alleman Hall Creasman & Tuttle LLP (57) ABSTRACT

To improve bending rigidity of a side sill against an inward load in a vehicle width direction during a lateral collision while suppressing a weight increase of the side sill, a vehicle side body structure includes: a side sill; a wheel house, a front lower portion; a center pillar; and a door formed to be opened at a position above the side sill and behind the center pillar. A rear portion of an impact bar provided to the door overlaps the rear portion of the side sill in side view when the door is closed. The side sill includes a reinforcing member reinforcing bending rigidity against an inward load. The side sill reinforcing member is provided in an intermediate portion of the side sill where the center pillar is located and the rear portion of the side sill in a longitudinal direction of the side sill.

20 Claims, 6 Drawing Sheets

VEHICLE SIDE BODY STRUCTURE

TECHNICAL FIELD

The present invention relates to a vehicle side body structure that includes: a side sill that has a closed cross-sectional structure extending in a vehicle longitudinal direction; a wheel house, a front lower portion of which is raised from a rear portion of the side sill; a center pillar that has a closed cross-sectional structure extending upward from the side sill; and a door that opens/closes an opening formed to be opened at a position above the side sill and behind the center pillar.

BACKGROUND ART

During a lateral collision of a vehicle (hereinafter referred to as a "lateral collision"), depending on a colliding position of a colliding object with a vehicle side surface, a side sill receives a load toward a vehicle width inner side (that is, a load causing such bending deformation that a joined portion of the side sill to the center pillar in a longitudinal direction is displaced toward the vehicle width inner side in a vehicle plan view) in conjunction with the load applied from a center pillar toward the vehicle width inner side (a cabin side).

In order to protect an occupant against such a lateral collision, a side sill that is reinforced against the load toward the vehicle width inner side as described above is proposed in Patent document 1 below, for example.

The side sill in Patent document 1 includes a side sill reinforcement, and, in the longitudinal direction of the side sill, the side sill reinforcement includes a base member and an extending member that is coupled to a rear end portion of the base member.

The extending member has a coupled portion that is fixed to the base member, and the coupled portion is coupled to the rear end portion of the base member from the vehicle width inner side by welding or the like. In this way, a coupled portion between the extending member and the base member is reinforced by an overlapping structure of the coupled portion of the extending member and the rear end portion of the base member.

Meanwhile, with increased needs for a light vehicle body weight for purposes of improving fuel economy and improving travel performance in recent years, a weight reduction of a vehicle body (the side sill) is desired while safety of the occupant against the lateral collision is secured.

At least the coupled portion of the side sill in Patent document 1 adopts the above-described overlapping structure, and thus can improve bending rigidity against the load toward the vehicle width inner side. However, since the overlapping structure is adopted for the entire coupled portion from an upper end to a lower end, that is, the entire coupled portion along a cross-sectional shape that is perpendicular to the longitudinal direction, there is still room for further weight reduction of the side sill.

For example, during the lateral collision, a lateral collision load is applied to the joined portion of the side sill to the center pillar via the center pillar. Accordingly, from a perspective of weight reduction, it is considered that local reinforcement of this joined portion to the center pillar is effective. However, in such a case, a difference in the rigidity may occur between a region where the center pillar is located and a peripheral portion thereof on each of front and rear sides in the longitudinal direction of the side sill. In addition, reinforcement of the entire side sill in the longitudinal direction is disadvantageous in terms of prevention of a weight increase of the side sill.

For this reason, in order to reinforce the side sill while suppressing the weight increase of the side sill, the inventors of the present application focused their attention to that it was advantageous to design the side sill in consideration of vehicle body members other than the center pillar that are provided around the side sill.

PRIOR ART DOCUMENTS

Patent Documents

Patent document 1: JP 2018-118697A

SUMMARY OF THE INVENTION

Problem to be Solved by the Invention

The present invention has been made in view of such a problem and therefore has a purpose of providing a vehicle side body structure capable of improving bending rigidity against an inward load in a vehicle width direction during a lateral collision while suppressing a weight increase of a side sill.

Means for Solving the Problem

The present invention is a vehicle side body structure including: a side sill that has a closed cross-sectional structure extending in a vehicle longitudinal direction; a wheel house, a front lower portion of which is raised from a rear portion of the side sill; a center pillar that has a closed cross-sectional structure extending upward from an intermediate portion of the side sill; and a door that opens and closes an opening formed to be opened at a position above the side sill and behind the center pillar. An impact bar provided to the door is disposed such that a rear portion thereof overlaps the rear portion of the side sill in a vehicle side view when the door is closed. The side sill includes a side sill reinforcing member that reinforces bending rigidity against a load toward an inner side in a vehicle width direction. The side sill reinforcing member is at least provided in the intermediate portion of the side sill, in which the center pillar is located, and the rear portion of the side sill in a longitudinal direction of the side sill.

With the above configuration, the side sill reinforcing member is at least provided in the intermediate portion of the side sill and the rear portion of the side sill in the longitudinal direction of the side sill. Thus, it is possible to securely receive a lateral collision load when the lateral collision load is transmitted in a dispersed manner to the intermediate portion of the side sill via the center pillar and to the rear portion of the side sill via the impact bar.

An aspect of the present invention further includes a wheel house reinforcing member that extends upward from the rear portion of the side sill along the wheel house. The wheel house reinforcing member overlaps the side sill reinforcing member in or adjacent a region where a rear portion of the impact bar is located in the vehicle side view.

With the above configuration, it is possible to securely receive the lateral collision load that is transmitted from the impact bar to the rear portion of the side sill during a lateral collision by an overlapping portion between the side sill reinforcing member and the wheel house reinforcing member.

As an aspect of the present invention, the wheel house reinforcing member is joined to the side sill reinforcing member, and the rear portion of the impact bar overlaps a joined portion between the wheel house reinforcing member and the side sill reinforcing member in the vehicle side view.

With the above configuration, it is possible to further securely receive the lateral collision load that is applied to the impact bar of the door during the lateral collision by the rear portion of the side sill.

As an aspect of the present invention, the side sill reinforcing member and the wheel house reinforcing member have a ridgeline extending in the vehicle longitudinal direction and a ridgeline extending in a vertical direction, respectively. The ridgeline extending in the vehicle longitudinal direction and the ridgeline extending in the vertical direction are defined to continue in the vehicle side view.

With the above configuration, since the side sill reinforcing member has the ridgeline extending in the vehicle longitudinal direction, it is possible to further improve the bending rigidity against the load toward the inner side in the vehicle width direction of the side sill in a vehicle plan view.

Furthermore, since the wheel house reinforcing member has the ridgeline extending in the vertical direction, it is possible to further improve the bending rigidity in the vehicle side view against the load toward the inner side in the vehicle width direction of the side sill and torsion rigidity around an axis extending in the longitudinal direction of the side sill.

Since these ridgelines are defined to continue in the vehicle side view, it is possible to further improve the bending rigidity of the side sill against the load toward the inner side in the vehicle width direction during the lateral collision.

As an aspect of the present invention, the impact bar overlaps the center pillar in the vehicle side view.

With the above configuration, it is possible to securely transmit the lateral collision load, which is received by the center pillar from a colliding object during the lateral collision, to the rear portion of the side sill via the impact bar, and it is also possible to securely transmit the lateral collision load, which is received by the impact bar from the colliding object, to a center pillar arrangement region of the side sill via the center pillar.

Thus, for example, compared to a configuration in which only a region where the center pillar is located or the like is formed to be strong, it is possible to improve the bending rigidity against the load toward the inner side in the vehicle width direction received by the side sill while suppressing a weight increase of the side sill.

As an aspect of the present invention, the side sill reinforcing member has an upper reinforcing member located in an upper portion of the side sill and a lower reinforcing member located in a lower portion of the side sill. In the side sill, an outer wall bead is provided in an outer wall that is located in an intermediate portion between the upper reinforcing member and the lower reinforcing member in the vertical direction.

With the above configuration, it is possible to further improve the bending rigidity of the side sill against the load toward the inner side in the vehicle width direction during the lateral collision.

Advantage of the Invention

According to the present invention, it is possible to improve the bending rigidity against the inward load in the vehicle width direction during the lateral collision while suppressing the weight increase of the side sill.

MODES FOR CARRYING OUT THE INVENTION

A detailed description will hereinafter be made on an embodiment of the present invention with reference to the drawings.

In the drawings, an arrow F, an arrow U, and an arrow OUT respectively indicate a vehicle front direction, a vehicle up direction, and an outer side in a vehicle width direction (a vehicle right direction). In addition, in the following description, the outer side in the vehicle width direction (a cabin outer side) will be referred to as a "vehicle width outer side," and an inward direction in the vehicle width direction (a cabin inner side) will be referred to as a "vehicle width inner side." Note that a vehicle side body structure of this embodiment, which will be described below, is provided substantially and bilaterally symmetrical on left and right sides of a vehicle.

Figure 1:
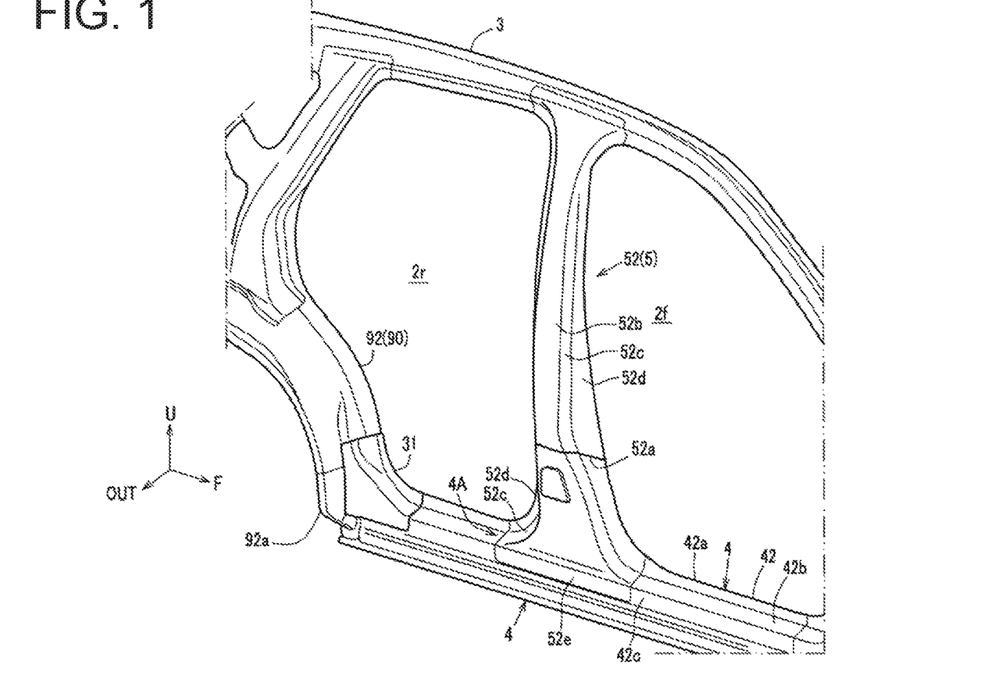
FIG. 1 is a perspective view in which a main section of a vehicle having a vehicle side body structure in this embodiment is seen from a right side of a vehicle body.

As illustrated in FIG. 1, side openings 2f, 2r are formed in a vehicle side body section. A roof side rail 3 that extends in a longitudinal direction is provided along upper sides of the side openings 2f, 2r. A side sill 4 that extends in the longitudinal direction is provided along lower sides of the side openings 2f, 2r.

A center pillar 5 that extends in a vertical direction is provided at an intermediate position between the side openings 2f, 2r in a vehicle longitudinal direction. In the center pillar 5, an upper end is joined to an intermediate portion of the roof side rail 3, which extends in the vehicle longitudinal direction, and a lower end is joined to an intermediate portion of the side sill 4, which extends in the vehicle longitudinal direction.

In this way, the side openings 2f, 2r are partitioned into openings on vehicle front and rear sides by the center pillar 5 and are provided as entry and exit openings 2f, 2r (the front entry and exit opening 2f and the rear entry and exit opening 2r).

Figure 2:
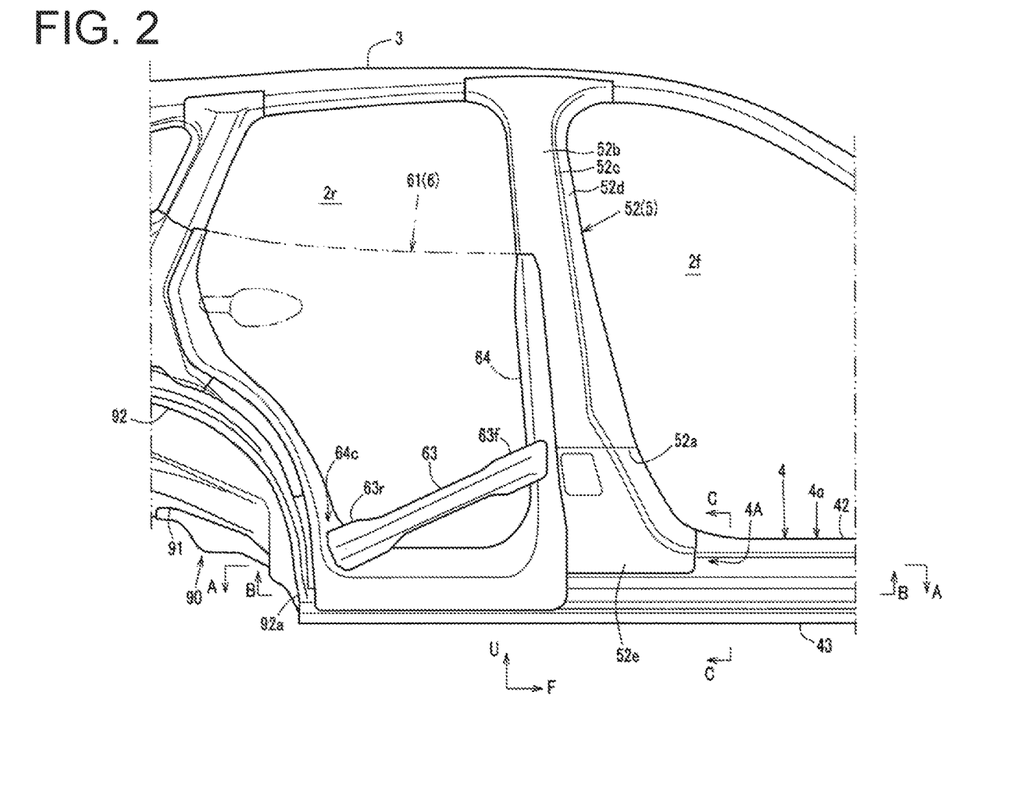
FIG. 2 is a right side view illustrating the main section of the vehicle having the vehicle side body structure in this embodiment.

The vehicle side body portion includes a side door that opens and closes a respective one of the front and rear entry and exit openings 2f, 2r. In FIG. 2, the side door on a front side (a front side door) is not illustrated while the side door on a rear side (a rear side door 6) is partially illustrated.

The rear side door 6 includes: a door body 61 constructed of a door outer panel, a door inner panel, and the like; and a plurality of impact bars 63 extending in the vehicle longitudinal direction. A front end of the rear side door 6 is supported by a portion on each of upper and lower sides of the center pillar 5 via an unillustrated hinge bracket.

The door body 61 is provided with an impact bar reinforcement 64 that extends along a rear side, a front side, and a lower side thereof.

In the door body 61, the impact bars 63 are provided at different heights from each other and are disposed between a front side and a rear side of the impact bar reinforcement 64 so as to couple the front side and the rear side.

FIG. 2 only illustrates the impact bar 63 that is located the lowest of the impact bars 63. A description will hereinafter be made on the impact bar 63 that is located the lowest.

Figure 5:
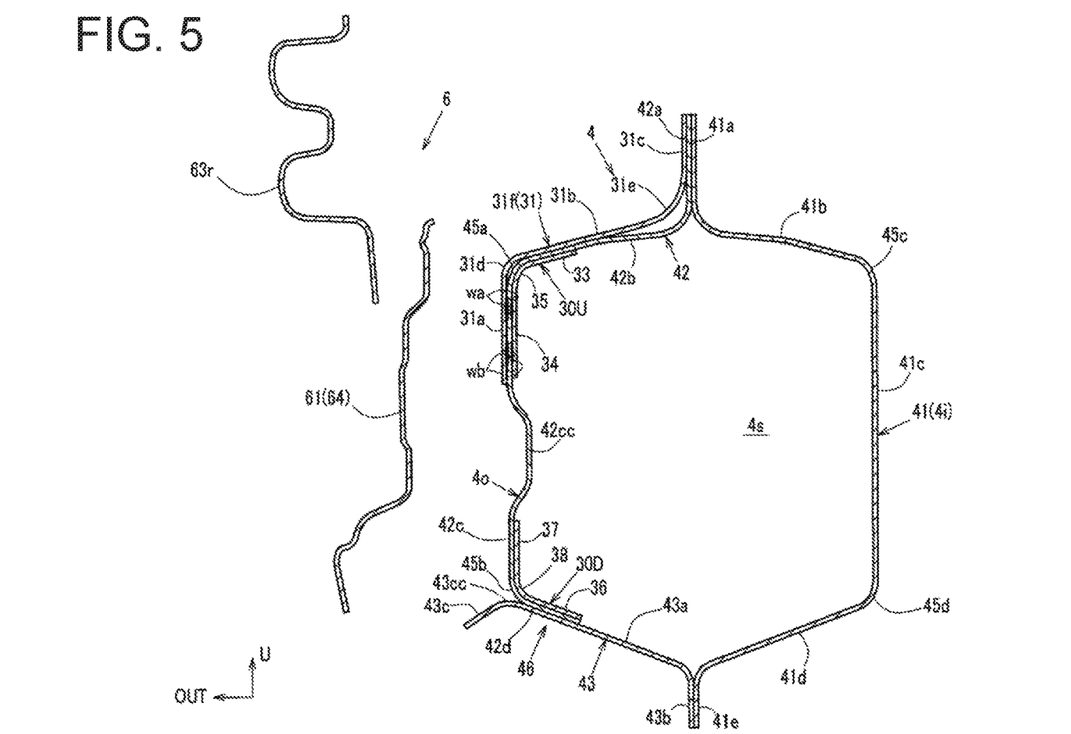
FIG. 5 is a cross-sectional view of the main section along line D-D in FIG. 3.

As illustrated in FIG. 2 and FIG. 5, the impact bar 63 is formed such that a cross section perpendicular to a longitudinal direction thereof has a substantially M-shape. The impact bar 63 is formed with a front flange 63f and a rear flange 63r, each of which is formed to be wider than an intermediate portion in the longitudinal direction, at front and rear ends.

In the impact bar 63, by using joint tools such as bolts, the front flange 63f is fixed to a lower portion of the front side of the impact bar reinforcement 64, and the rear flange 63r is fixed to a corner portion 64c between a lower portion of the rear side and a lower side of the impact bar reinforcement 64.

In this way, the impact bar 63 is provided in a lower portion of the rear side door 6 in a manner to be tilted upward to the front and downward to the rear.

Here, a joint position of the rear flange 63r of the impact bar 63 to the rear side of the impact bar reinforcement 64 is located at a lower end of the lower portion of the rear side as described above, that is, the corner portion 64c between the rear side and the lower side.

Figure 3:
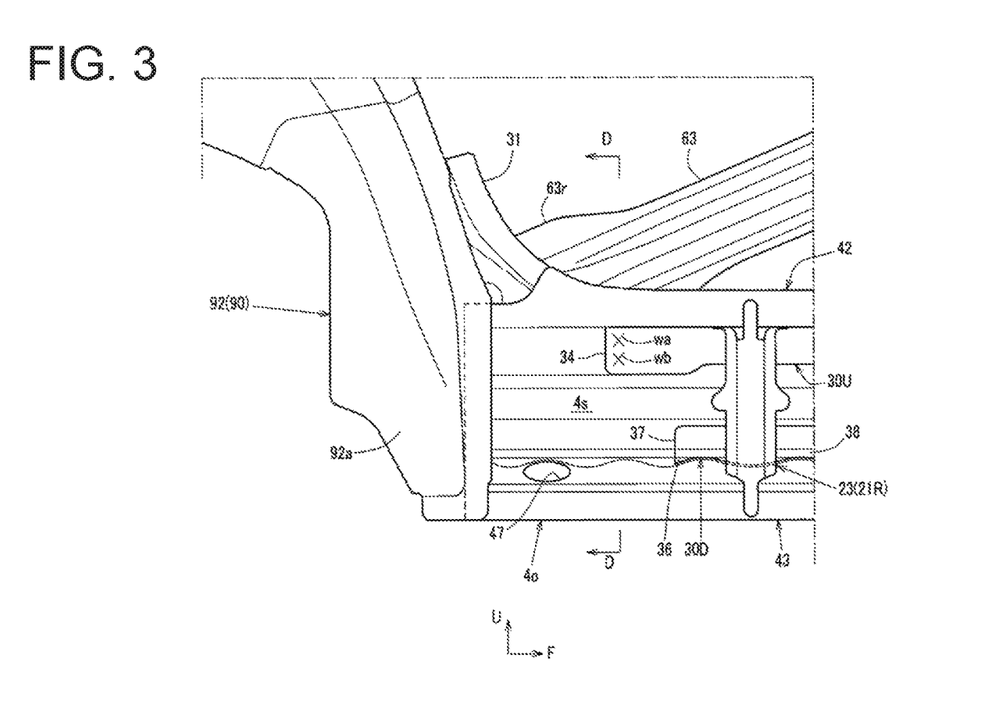
FIG. 3 is an enlarged view of the main section around a rear portion of a side sill from which a side sill inner is removed and which is viewed from a vehicle width inner side.

In this way, as illustrated in FIG. 2, when the rear entry and exit opening 2r is closed by the rear side door 6 (hereinafter referred to as "when the rear side door 6 is closed"), in the impact bar 63, the front flange 63f of the impact bar 63 (that is, a joint portion to the front side of the impact bar reinforcement 64) overlaps the center pillar 5 in a vehicle side view, and, as illustrated in FIG. 2, FIG. 3, and FIG. 5, the rear flange 63r of the impact bar 63 (that is, the joint portion to the corner portion 64c between the rear side and the lower side of the impact bar reinforcement 64) overlaps a rear portion of the side sill 4 in the vehicle side view.

Figure 12:
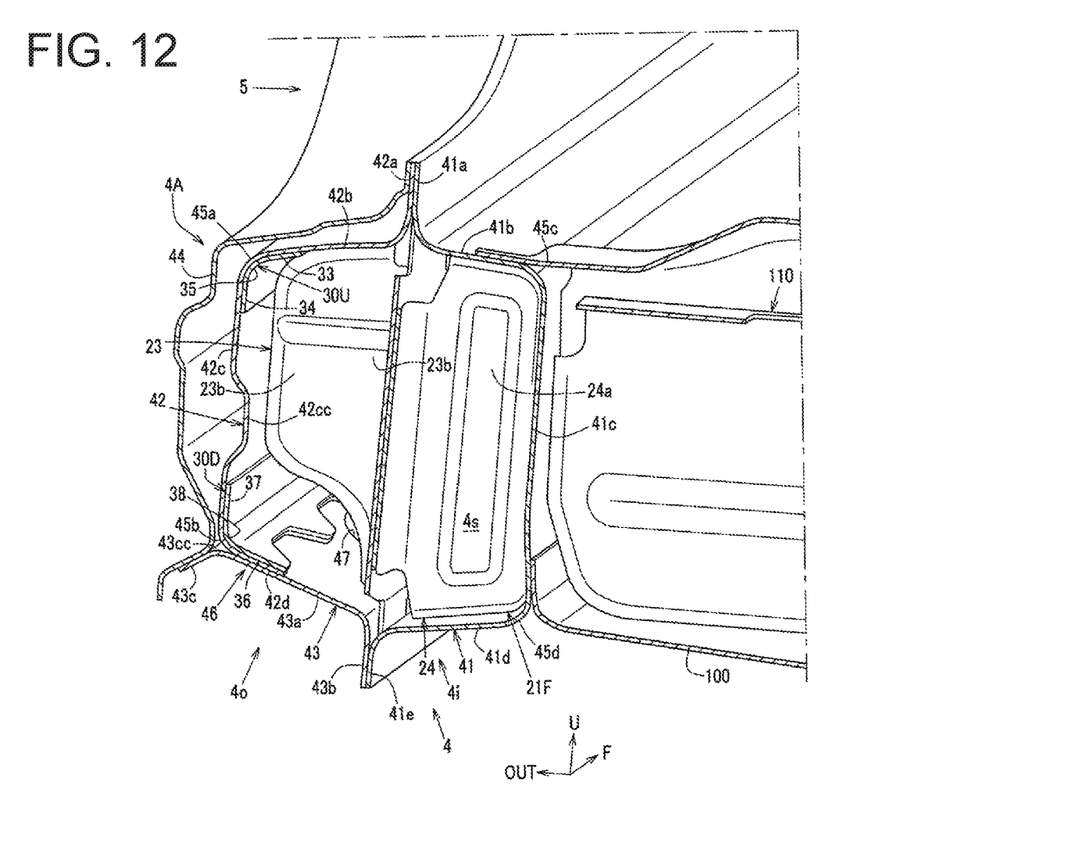
FIG. 12 is a perspective cross-sectional view illustrating the main section of the vehicle side body structure and corresponding to an arrow direction of C-C in FIG. 2.

As illustrated in FIG. 5 and FIG. 12, the side sill 4 is a vehicle body rigid member that has a closed cross-sectional space 4s extending in the vehicle longitudinal direction, and includes: a first member 41, a second member 42, and a third member 43 constituting the closed cross-sectional space 4s; and an exterior panel 44 (only illustrated in FIG. 12) attached to the vehicle width outermost side of the side sill 4.

As a side sill inner 4i formed in a hat shape whose perpendicular cross section to the vehicle longitudinal direction is projected to the vehicle width inner side, the first member 41 is provided on the vehicle width inner side of the side sill 4. More specifically, the first member 41 is integrally formed by including an upper end flange 41a extending in the vertical direction, an upper wall 41b extending to the vehicle width inner side from a lower end of the upper end flange 41a, an inner wall 41c extending downward from a vehicle width inner end of the upper wall 41b, a lower wall 41d extending to the vehicle width outer side from a lower end of the inner wall 41c, and a lower end flange 41e extending downward from a vehicle width outer end of the lower wall 41d.

As a side sill outer 4o formed in a hat shape whose perpendicular cross section to the vehicle longitudinal direction is projected to the vehicle width outer side, the second member 42 and the third member 43 are provided on the vehicle width outer side of the first member 41.

More specifically, the second member 42 is integrally formed by including an upper end flange 42a located in an upper portion of the side sill outer 4o and an intermediate portion in the vertical direction and extending in the vertical direction, an upper wall 42b extending to the vehicle width outer side from a lower end of the upper end flange 42a, an outer wall 42c extending downward from an vehicle width outer end of the upper wall 42b, and a lower end flange 42d extending to the vehicle width inner side from a lower end of the outer wall 42c. The third member 43 is located in a lower portion of the side sill outer 4o and is integrally formed by including a lower wall 43a extending to the vehicle width inner side and a lower end flange 43b extending downward from a vehicle width inner end of the lower wall 43a.

The upper end flanges 41a, 42a of the first member 41 and the second member 42 as well as the lower end flanges 41e, 43b of the first member 41 and the third member 43 are integrally joined to each other by spot welding or the like. Furthermore, the lower end flange 42d of the second member 42 is joined to the lower wall 43a of the third member 43 from above (a side of the closed cross-sectional space 4s).

In this way, the side sill 4 constitutes the closed cross-sectional space 4s therein by the upper wall 41b, the inner wall 41c, and the lower wall 41d of the first member 41, the upper wall 42b and the outer wall 42c of the second member 42, and the lower wall 43a of the third member 43. In addition, in the side sill 4, ridgelines 45a, 45b, 45c, 45d extending in the vehicle longitudinal direction are respectively defined between the upper wall 42b and the outer wall 42c, the outer wall 42c and the lower end flange 42d, the upper wall 41b and the inner wall 41c, and the inner wall 41c and the lower wall 41d. Of these ridgelines 45a, 45b, 45c, 45d, the ridgeline 45a defined between the upper wall 42b and the outer wall 42c, that is, the ridgeline 45a defined at an upper end of the outer wall 42c is set as an upper outer ridgeline 45a, and the ridgeline 45b defined between the outer wall 42c and the lower end flange 42d, that is, the ridgeline 45b defined at the lower end of the outer wall 42c is set as a lower outer ridgeline 45b.

In addition, as illustrated in FIG. 5 and FIG. 12, the outer wall 42c of the side sill 4 is provided with an outer wall bead 42cc, which is dented to the side of the closed cross-sectional space 4s, near a center in the vertical direction.

Figure 6:
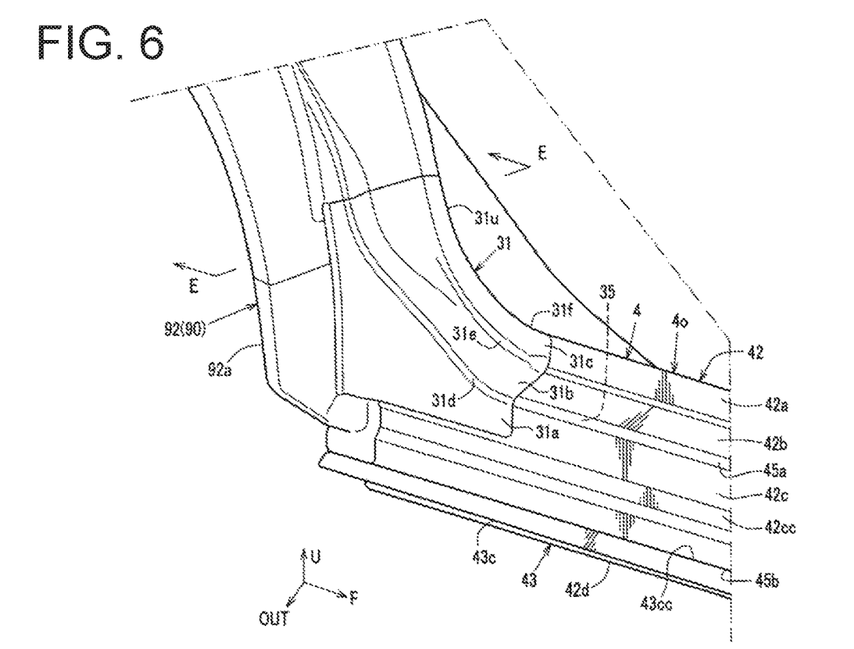
FIG. 6 is an enlarged view of the main section around the rear portion of the side sill in FIG. 1.

Furthermore, as illustrated in FIG. 5, FIG. 6, and FIG. 12, the third member 43 is further formed with a vehicle width outer end flange 43c extending to the vehicle width outer side from a vehicle width outer end of the lower wall 43a. This vehicle width outer end flange 43c extends to the vehicle width outer side from an upper end portion of an overlapping portion 46 between the lower end flange 42d of the second member 42 and the lower wall 43a of the third member 43.

In a cross-sectional view that is perpendicular to the longitudinal direction of the side sill 4, the vehicle width outer end flange 43c is projected downward and to the vehicle width outer side from a position between the outer wall 42c and the lower wall 43a of the side sill 4 in a manner to be bent from these outer wall 42c and lower wall 43a. In this way, a ridgeline 43cc extending in the vehicle longitudinal direction is defined in a base end portion of the vehicle width outer end flange 43c.

In the cross-sectional view that is perpendicular to the longitudinal direction of the side sill 4, this ridgeline 43cc matches or is located near the above-described lower outer ridgeline 45b. In the present example, the ridgeline 43cc located in the base end portion of the vehicle width outer end flange 43c is located below and near the lower outer ridgeline 45b.

Figure 9:
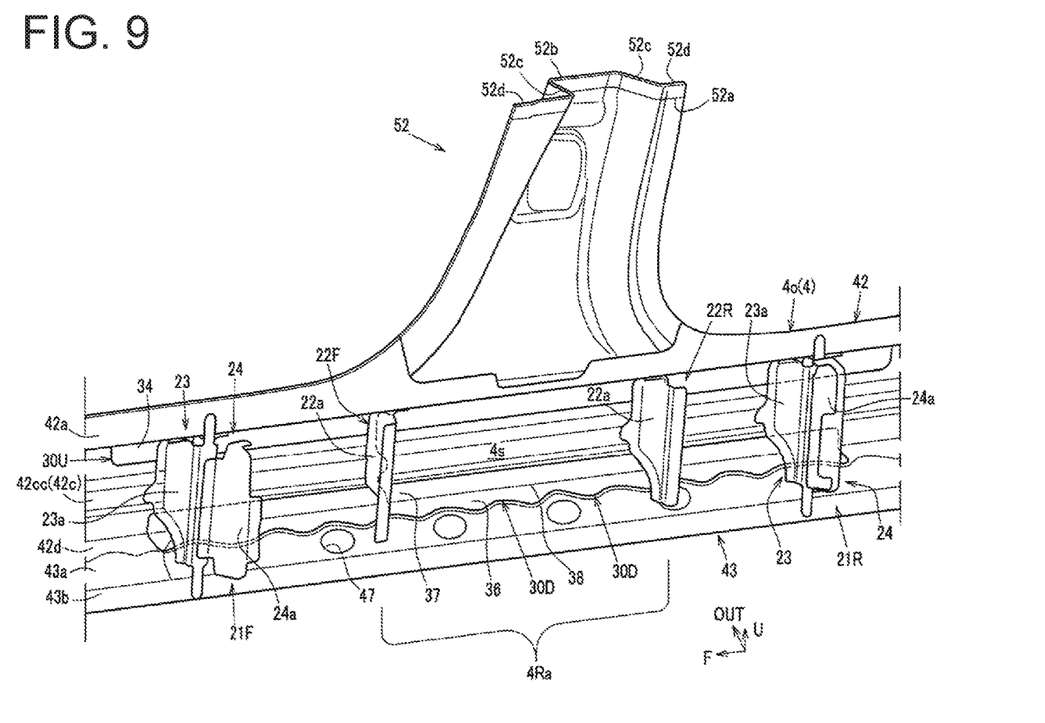
FIG. 9 is a perspective view in which a pillar inner is removed from FIG. 8.

Moreover, as illustrated in FIG. 9, the lower wall 43a of the third member 43 in the side sill 4 is formed with a plurality of through holes 47, each of which has a substantially circular shape in a plan view, along the vehicle longitudinal direction. Each of these through holes 47 is used to insert a corrosion inhibitor spray gun (not illustrated) in the closed cross-sectional space 4s in order to introduce an electrodeposition liquid or the like into the closed cross-sectional space 4s of the side sill 4 or spraying a corrosion inhibitor on an inner surface that is a surface facing the closed cross-sectional space 4s of the side sill 4.

As illustrated in FIG. 12, a floor panel 100 that forms an unillustrated tunnel portion raised upward in a central portion in the vehicle width direction and extending in the vehicle longitudinal direction is stretched between the above-described side sills 4 on both sides in a vehicle body lower portion. Furthermore, as illustrated in FIG. 11, in a rear end portion of the floor panel 100, a kick-up portion 101 is provided in a manner to be raised upward from the rear end portion.

Figure 11:
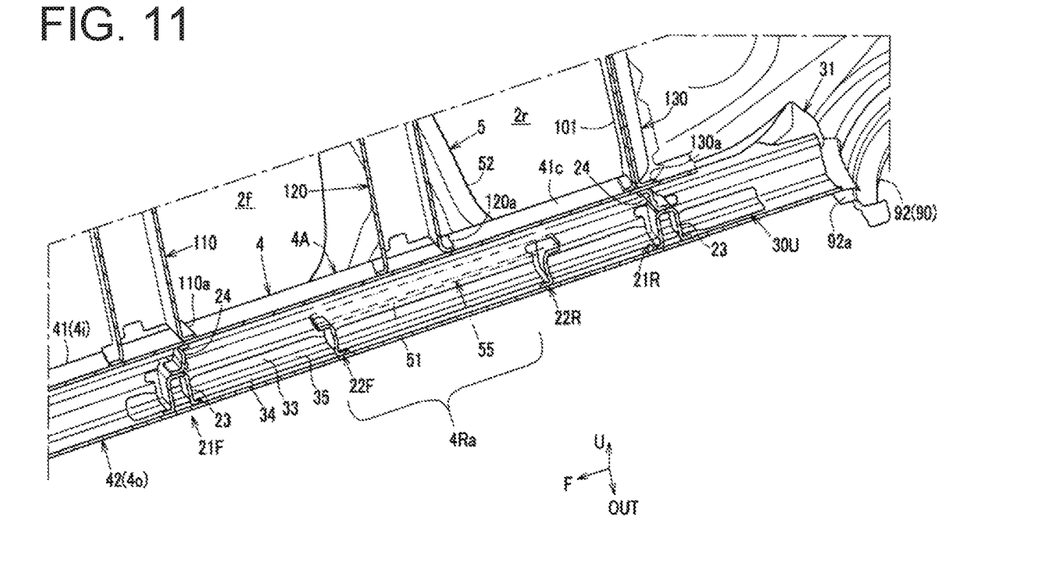
FIG. 11 is a cross-sectional view illustrating the main section taken along line B-B in FIG. 2.

As illustrated in FIG. 11 and FIG. 12, a front crossmember 110 (a 2.0 crossmember) and an intermediate crossmember 120 (a 2.5 crossmember), each of which extends in the vehicle width direction and couples the side sill 4 and the tunnel section, are disposed on an upper surface of the floor panel 100 on both sides of the tunnel section. In a cross-sectional view that is perpendicular to the vehicle longitudinal direction, each of the front crossmember 110 and the intermediate crossmember 120 is formed in a hat shape that is opened downward and, with the floor panel 100, constitutes a closed cross-sectional space extending in the vehicle width direction.

Furthermore, in an upper portion of the kick-up portion 101, a rear crossmember 130 (a 3.0 crossmember) that is joined and fixed to the upper portion from a back surface side and has a closed cross-sectional space extending in the vehicle width direction is disposed.

These crossmembers 110, 120, 130 are disposed away from each other in the vehicle longitudinal direction. In the present example, in the vehicle longitudinal direction, the front crossmember 110 is disposed to be located in an intermediate portion of the front entry and exit opening 2f, the intermediate crossmember 120 is disposed to be located on the center pillar 5, and the rear crossmember 130 is disposed to be located in an intermediate portion of the rear entry and exit opening 2r.

As illustrated in FIG. 11, flanges 110a, 120a, 130a formed at outer ends in the vehicle width direction of these crossmembers 110, 120, 130 are joined to the inner wall 41c of the side sill 4, and each of these crossmembers 110, 120, 130 can receive a load toward the vehicle width inner side transmitted from the side sill 4.

Figure 7:
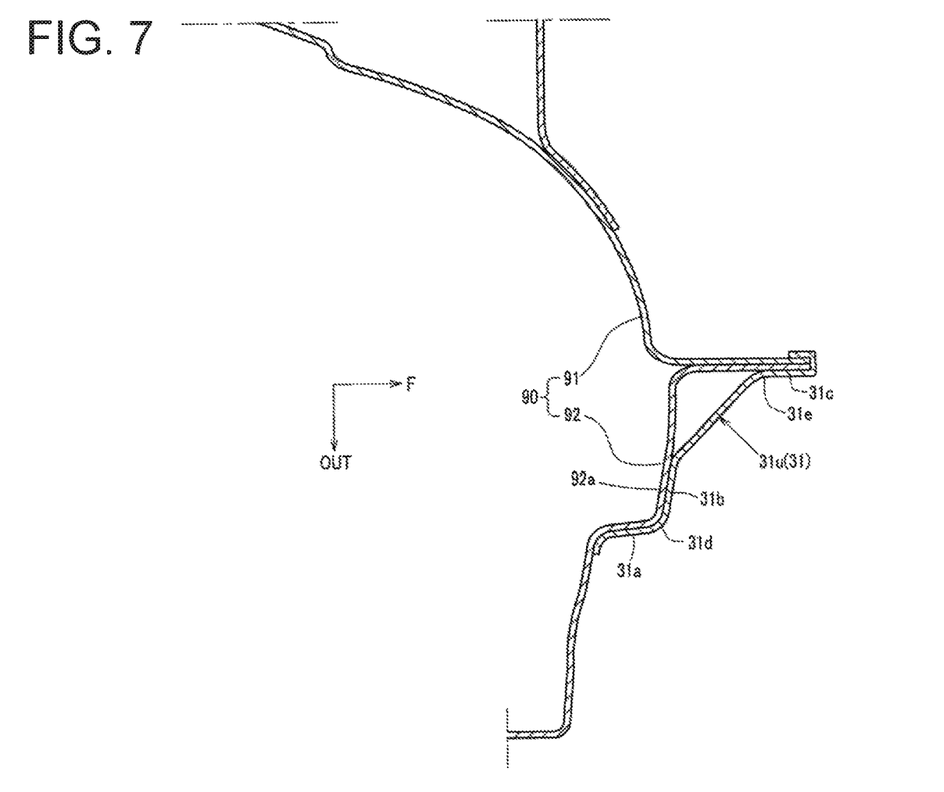
FIG. 7 is a cross-sectional view of a main section along line E-E in FIG. 6.

As illustrated in FIG. 1 to FIG. 3, a rear wheel house 90 that forms a lower portion of a rear side of the rear entry and exit opening 2r from a rear portion of a lower side thereof is disposed behind the side sill 4. As illustrated in FIG. 7, the rear wheel house 90 includes a rear wheel house inner 91 and a rear wheel house outer 92, each of which is formed in an arch shape projected upward in a vehicle side view, and these accommodate a rear wheel from above.

As illustrated in FIG. 3 and FIG. 11, a front lower portion 92a of the rear wheel house outer 92 is joined to a rear end of the side sill 4.

As illustrated in FIG. 9 to FIG. 12, the side sill 4 includes sections 21F, 21R, 22F, 22R, each of which partitions the closed cross-sectional space 4s in the vehicle longitudinal direction.

The sections 21F, 21R, 22F, 22R are provided along the vehicle longitudinal direction of the side sill 4. In the present example, the sections 21F, 21R, 22F, 22R are at least provided at four positions in a front portion and a rear portion of a center pillar arrangement region 4Ra and a portion in front of and a portion behind the center pillar arrangement region 4Ra in the longitudinal direction of the side sill 4.

Note that the center pillar arrangement region 4Ra is located in the intermediate portion of the side sill 4 in the vehicle longitudinal direction.

These sections 21F, 21R, 22F, 22R are set as a pillar forward section 21F, a pillar front section 22F, a pillar rear section 22R, and a pillar rearward section 21R in an order from a front side to a rear side.

Figure 10:
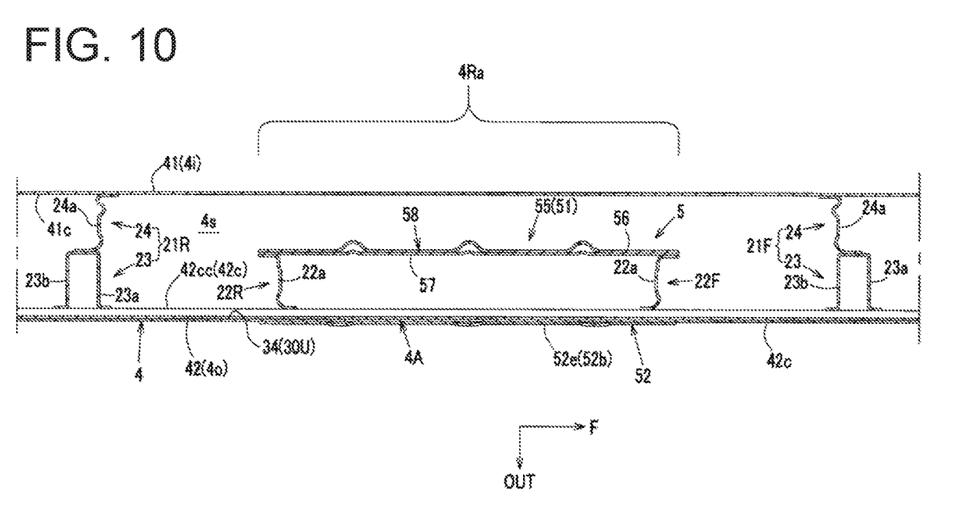
FIG. 10 is a cross-sectional view illustrating the main section taken along line A-A in FIG. 2.

As illustrated in FIG. 9 and FIG. 10, each of the pillar front section 22F and the pillar rear section 22R includes a vertical wall 22a that partitions the closed cross-sectional space 4s in the vehicle longitudinal direction. In addition, as illustrated in FIG. 9, FIG. 10, FIG. 11, and FIG. 12, each of the pillar forward section 21F and the pillar rearward section 21R is constructed of an outer section component 23 located on the vehicle width outer side and an inner section component 24 located on the vehicle width inner side.

As illustrated in FIG. 10, the outer section component 23 includes a front wall 23a and a rear wall 23b separately disposed in the vehicle longitudinal direction, and the inner section component 24 includes a vertical wall 24a extending in the vertical direction and the vehicle width direction.

The above-described pillar front section 22F partitions the vehicle width outer side of the closed cross-sectional space 4s by the vertical wall 22a. The pillar forward section 21F partitions the vehicle width outer side of the closed cross-sectional space 4s by the front wall 23a and the rear wall 23b provided in the outer section component 23, and partitions the vehicle width inner side of the closed cross-sectional space 4s by the vertical wall 24a provided in the inner section component 24.

The side sill outer 4o, which is constructed of the second member 42 and the third member 43, is provided with first reinforcing members 30U, 30D and a second reinforcing member 31 reinforcing bending rigidity against the load toward the vehicle width inner side.

As illustrated in FIG. 5, FIG. 9, and FIG. 12, the first reinforcing members 30U, 30D are the first upper reinforcing member 30U located in the upper portion of the side sill 4 and the first lower reinforcing member 30D located in the lower portion of the side sill 4.

As illustrated in FIG. 5, FIG. 8, FIG. 9, and FIG. 12, in the vertical direction of the outer wall 42c of the side sill, the outer wall bead 42cc is provided at an intermediate position in the vertical direction located between the first upper reinforcing member 30U and the first lower reinforcing member 30D.

As illustrated in FIG. 9 to FIG. 11, the first upper reinforcing member 30U is joined to the side sill 4 at a height position of a center pillar joined portion 4A.

The first upper reinforcing member 30U is integrally formed substantially in an L-shape in the cross-sectional view that is perpendicular to the vehicle longitudinal direction by a lateral side 33 (see FIG. 11 and FIG. 12) extending in the vehicle width direction along the upper wall 42b of the second member 42 in the side sill 4 and a vertical side 34 extending downward from a vehicle width outer end of the lateral side 33.

The first upper reinforcing member 30U is partially provided in the cross-sectional view that is perpendicular to the longitudinal direction of the side sill 4.

In detail, as illustrated in FIG. 5 and FIG. 12, the first upper reinforcing member 30U is joined to the side sill 4 in a manner to only cover the single ridgeline (the ridgeline 45a in the present example) among the plural (four in the present example) ridgelines 45a, 45b, 45c, 45d extending in the longitudinal direction of the side sill 4.

Further in detail, as illustrated in the same drawings, in a corner portion between the upper wall 42b and the outer wall 42c of the second member 42 in the side sill 4, the lateral side 33 and the vertical side 34 of the first upper reinforcing member 30U are respectively arranged on the upper wall 42b of the second member 42 and the outer wall 42c of the second member 42 from the side of the closed cross-sectional space 4s such that a ridgeline 35 provided between the lateral side 33 and the vertical side 34 abuts the upper outer ridgeline 45a provided in the corner portion, and the first upper reinforcing member 30U is joined at a plurality of positions along the vehicle longitudinal direction by welding or the like.

As illustrated in FIG. 1, FIG. 2, FIG. 10, and FIG. 12, the first lower reinforcing member 30D is joined to the side sill 4 at a position lower than the height position of the center pillar joined portion 4A. In detail, as illustrated in FIG. 12, the first lower reinforcing member 30D is integrally formed substantially in an L-shape in the cross-sectional view that is perpendicular to the vehicle longitudinal direction by a lateral side 36 extending in the vehicle width direction along the lower wall 41d of the third member 43 in the side sill 4 and a vertical side 37 extending upward from a vehicle width outer end of the lateral side 36. In a corner portion between the outer wall 42c of the second member 42 and the lower wall 43a of the third member 43 in the side sill 4, the vertical side 37 and the lateral side 36 of the first lower reinforcing member 30D are respectively joined to the outer wall 42c of the second member 42 and the lower wall 43a of the third member 43 via the lower end flange 42d of the second member 42 at plural positions from the side of the closed cross-sectional space 4s along the vehicle longitudinal direction by welding or the like such that a ridgeline 38 between the vertical side 37 and the lateral side 36 abuts the lower outer ridgeline 45b provided in the corner portion.

As illustrated in FIG. 3, FIG. 5, and FIG. 9 to FIG. 12, these first upper reinforcing member 30U and first lower reinforcing member 30D continuously extend in the vehicle longitudinal direction from a position in front of the center pillar 5 to the rear portion of the side sill 4 in a manner to cross the center pillar 5 along the longitudinal direction of the side sill 4.

The first upper reinforcing member 30U will be described in detail. A front end of the first upper reinforcing member 30U extends to a position in front of the pillar forward section 21F as illustrated in FIG. 9 to FIG. 11 and also extends to a position where the first upper reinforcing member 30U overlaps the front crossmember 110 in the vehicle side view as illustrated in FIG. 11.

A rear end of the first upper reinforcing member 30U extends to a position behind the pillar rearward section 21R as illustrated in FIG. 9 and FIG. 11, and also extends to a position behind the rear crossmember 130 as illustrated in FIG. 11.

That is, in the vehicle longitudinal direction, first upper reinforcing member 30U is provided in a manner to cross the pillar forward section 21F, the pillar front section 22F, the pillar rear section 22R, and the pillar rearward section 21R, and is also provided in a manner to cross the crossmembers 110, 120, 130 on the front side, the intermediate side, and the rear side.

As illustrated in FIG. 1, FIG. 3, FIG. 4A, and FIG. 5 to FIG. 7, the above-described second reinforcing member 31 is provided in the rear portion of the side sill 4 and extends upward from the rear portion of the side sill 4 along the rear wheel house 90.

As illustrated in FIG. 6, the second reinforcing member 31 includes an upward extending portion 31u extending upward and a forward extending section 31f extending forward. As illustrated in FIG. 5 to FIG. 7, in a corner portion between the front lower portion 92a of the rear wheel house outer 92 and the rear portion of the side sill 4 in the vehicle side view, the upward extending section 31u and the forward extending section 31f are respectively joined to the front lower portion 92a of the rear wheel house outer 92 and the rear portion of the side sill 4 by welding or the like.

In other words, as illustrated in FIG. 4A, FIG. 5, FIG. 6, and FIG. 7, the second reinforcing member 31 is integrally formed in a substantially triangular shape in the vehicle side view by a side wall 31a extending in the vertical direction and the vehicle longitudinal direction, a vertical wall 31b extending to the vehicle width inner side from an upper edge of the side wall 31a, and a flange 31c extending upward from a vehicle width inner end of the vertical wall 31b.

In the second reinforcing member 31, ridgelines 31d, 31e continuously extending along an extending direction of the second reinforcing member 31 are respectively defined between the side wall 31a and the vertical wall 31b and between the vertical wall 31b and the flange 31c. These ridgelines 31d, 31e extend substantially along the vertical direction in the upward extending portion 31u, and extend substantially along the vehicle longitudinal direction in the forward extending section 31f.

As illustrated in FIG. 6, the forward extending section 31f of the second reinforcing member 31 is joined to the rear portion and the upper portion of the side sill 4 from the vehicle width outer side. More specifically, as illustrated in FIG. 5 and FIG. 6, in the second reinforcing member 31, the flange 31c of the forward extending section 31f and the side wall 31a of the forward extending section 31f are respectively joined to the upper end flange 42a of the second member 42 and the outer wall 42c of the second member 42 in the side sill 4 in a manner to cover the upper end flange 42a and the outer wall 42c from the vehicle width outer side, and the vertical wall 31b of the forward extending section 31f is joined to the upper wall 42b of the second member 42 in a manner to cover the upper wall 42b from above.

In this way, as illustrated in FIG. 3, FIGS. 4A, 4B, and FIG. 5, in the rear portion of the side sill 4, a front portion of the second reinforcing member 31, that is, the forward extending section 31f is located on the vehicle width outer side of a rear portion of the first upper reinforcing member 30U and overlaps the rear portion of the first upper reinforcing member 30U in the vehicle side view (that is, in the vehicle width direction).

Figure 4A:
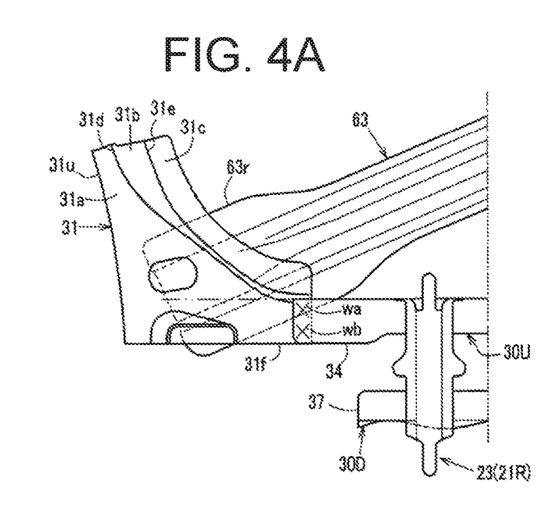
FIG. 4A is an enlarged view of the main section in which a side sill outer and a rear wheel house are removed from FIG. 3.
Figure 4B:
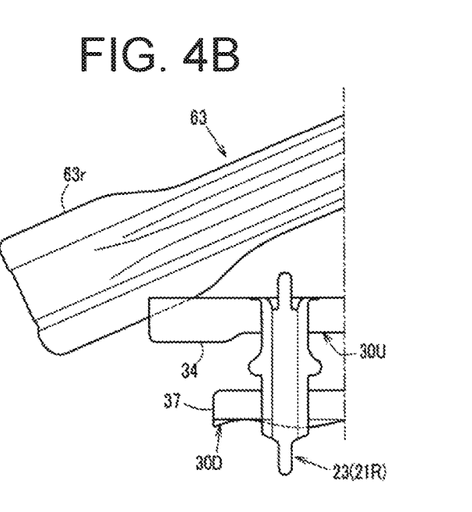
FIG. 4B is an enlarged view of the main section in which a second reinforcing member is further removed therefrom.

Furthermore, as illustrated in FIG. 3, FIG. 4A, and FIG. 5, in the rear portion of the side sill 4, the second reinforcing member 31 overlaps the rear end flange 63r of the impact bar 63 in the vehicle side view.

More specifically, when the rear side door 6 is closed, as described above, the rear end flange 63r of the impact bar 63, which is provided in the lower portion of the rear side door 6, overlaps the rear portion of the side sill 4 in the vehicle side view. Accordingly, as illustrated in FIG. 3, FIGS. 4A, 4B, and FIG. 5, in the rear portion of the side sill 4, the rear end flange 63r of the impact bar 63, the forward extending section 31f of the second reinforcing member 31, the second member 42 of the side sill 4, and the rear portion of the first upper reinforcing member 30U are sequentially provided from the outer side to the inner side in the vehicle width direction, and these overlap each other in the vehicle side view.

In the present example, in an overlapping portion of the second reinforcing member 31, the second member 42 of the side sill 4, and the first upper reinforcing member 30U, these three pieces are integrally joined to each other by spot welding. In FIG. 3 and FIG. 4A, an "x" represents joined positions wa, wb.

In other words, as illustrated in FIG. 5, the second reinforcing member 31 and the first upper reinforcing member 30U are joined to each other at the joined positions wa, wb in a manner to hold the second member 42 of the side sill 4 therebetween.

As illustrated in FIG. 4A, the rear end flange 63r of the impact bar 63 overlaps the joined portion (at least the joined position wa) between the second reinforcing member 31 and the first upper reinforcing member 30U in the vehicle side view.

In addition, as illustrated in FIG. 5 and FIG. 12, the ridgeline 35 defined between the lateral side 33 and the vertical side 34 of the first upper reinforcing member 30U extends for an entire length of the first upper reinforcing member 30U in the vehicle longitudinal direction.

Meanwhile, as illustrated in FIG. 4A and FIG. 6, as described above, the ridgelines 31d, 31e of the second reinforcing member 31 extend substantially along the vertical direction in the upward extending portion 31u located in the rear portion of the second reinforcing member 31, and extend substantially along the vehicle longitudinal direction in the forward extending section 31f positioned in the front portion of the second reinforcing member 31.

In the present example, the rear portion of the ridgeline 35 extending in the longitudinal direction and the lower portions (front portions) of the ridgelines 31d, 31e extending in the vertical direction are formed to be continued in the vehicle side view (see FIG. 4A, FIG. 5, FIG. 6, and FIG. 12).

Figure 8:
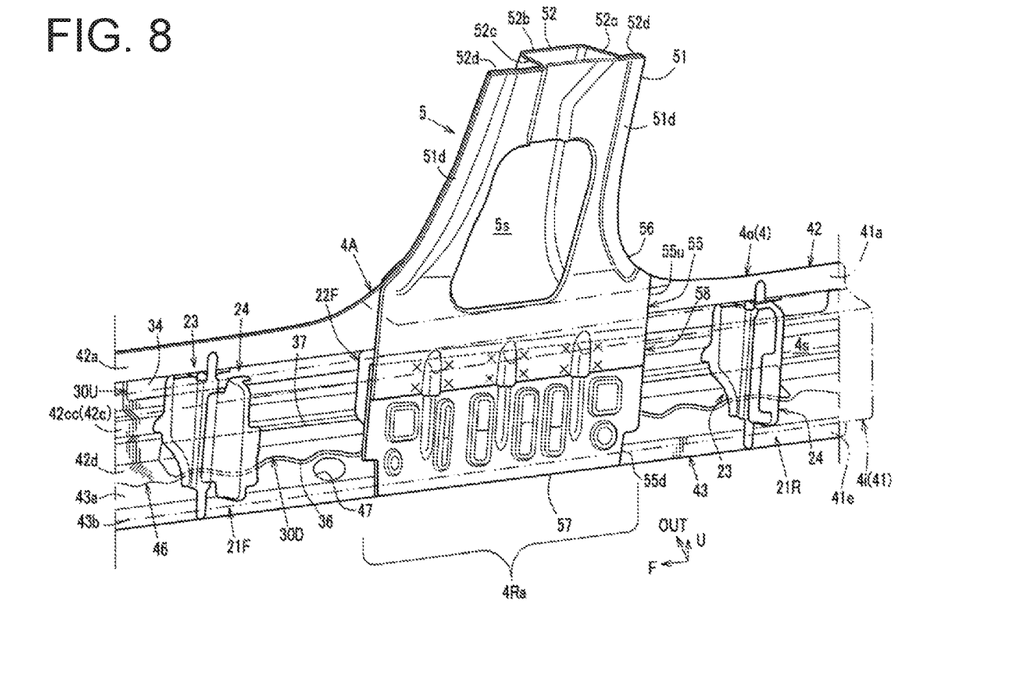
FIG. 8 is a perspective view in which the side sill inner is removed and a joined portion between the side sill and a center pillar and a portion therearound are seen from a vehicle width inner side.

As illustrated in FIG. 1, FIG. 8, and FIG. 9, the above-described center pillar 5 includes a pillar inner 51 and a pillar outer 52 and is vertically provided in the side sill 4 by welding lower portions of these to the side sill 4. The lower portion of the center pillar 5 (a root region for the side sill 4) is formed such that a width thereof is gradually increased downward in the vehicle longitudinal direction from a portion of the lower portion near an upper end 52a (see FIG. 1, FIG. 2, and FIG. 9) to the upper end of the side sill 4.

As illustrated in FIG. 8, the pillar inner 51 is formed in a vertical wall shape (a substantially flat plate shape) in which a substantially entire portion in the vertical direction extends in the vehicle width direction, and is formed with a flange 51d on each of front and rear sides thereof.

As illustrated in FIG. 1, FIG. 8, and FIG. 9, the pillar outer 52 is integrally formed by including an outer wall 52b extending in the vertical direction and the vehicle width direction, front and rear vertical walls 52c extending to the vehicle width inner side from front and rear ends of the outer wall 52b, a flange 52d on each of the front and rear sides formed along the vertical wall 52c such that the substantially entire portion in the vertical direction has a hat-shaped cross-sectional shape opened to the vehicle width inner side in the cross-sectional view that is perpendicular to the vertical direction.

The center pillar 5 is configured to have a closed cross-sectional space 5s extending in the vertical direction between the pillar inner 51 and the pillar outer 52 by joining the front edge flanges 51d, 52d and the rear edge flanges 51d, 52d of these.

A lower portion of the pillar outer 52 is joined to the second member 42 of the side sill 4, and this joint structure will be described.

As illustrated in FIG. 1, FIG. 2, and FIG. 10, the lower portion of the pillar outer 52 is formed with a lower end flange 52e extending downward from a lower end of the outer wall 52b, and this lower end flange 52e is joined to the outer wall 42c of the second member 42 in the side sill 4. In this way, as illustrated in FIG. 1 and FIG. 10, the center pillar 5 and the side sill 4 are arranged such that the outer wall 52b and the outer wall 42c are substantially flush in the vehicle width direction. In addition, each of the front and rear flanges 52d of the pillar outer 52 and each of the front and rear flanges 51d of the pillar inner 51 are integrally joined to each other as described above. As illustrated in FIG. 8, lower portions of the flanges 51d, 52d on each of the front and rear sides are integrally joined to each other in a manner to hold the upper end flange 42a of the second member 42 on a side of the side sill outer 4o from both of the inner and outer sides in the vehicle width direction. In this way, each of the front and rear flanges 51d, 52d of the center pillar 5 and the upper end flange 42a of the side sill 4 are arranged to be substantially flush in the vehicle width direction.

In this state, as illustrated in FIG. 1, the vertical wall 52c on each of the front and rear sides of the pillar outer 52 is brought into a state where a lower end thereof contacts the upper wall 42b of the second member 42 in the side sill 4, and the vertical wall 52c extending in the vertical direction on each of the front and rear sides and the upper wall 42b extending in the longitudinal direction in the second member 42 of the side sill 4 continuously and smoothly extend in a corner portion of these in the vehicle side view.

The pillar inner 51 is formed such that the lower portion is widened in the vehicle longitudinal direction so as to correspond to the lower portion of the pillar outer 52, and forms an extending portion 55 that extends to be lower than an upper end position of the side sill 4.

More specifically, in the center pillar arrangement region 4Ra in the vehicle longitudinal direction of the side sill 4, as illustrated in FIG. 8 and FIG. 10, the extending portion 55 is disposed in the closed cross-sectional space 4s in a manner to partition the closed cross-sectional space 4s into spaces on the inner and outer sides in the vehicle width direction. As illustrated in FIG. 8, an upper end 55u of the extending portion 55 is interposed between the upper end flanges 41a, 42a of the first member 41 and the second member 42 in the side sill 4 and is integrally joined to these upper end flanges 41a, 42a. Furthermore, a lower end 55d of the extending portion 55 is interposed between the lower end flanges 41e, 43b of the first member 41 and the third member 43 in the side sill 4 and is integrally joined to these lower end flanges 41e, 43b.

Note that as described above, the lower portion of the pillar inner 51 including the extending portion 55 is formed to be wide in the vehicle longitudinal direction.

In addition, as illustrated in FIG. 8, the pillar inner 51 has a pillar inner upper 56 and a pillar inner lower 57 provided below the pillar inner upper 56. A lower portion of the pillar inner upper 56 and an upper portion of the pillar inner lower 57 overlap each other in the vehicle width direction in the closed cross-sectional space 4s of the side sill 4. That is, as illustrated in FIG. 8 and FIG. 10, an overlapping portion 58 between the lower portion of the pillar inner upper 56 and the upper portion of the pillar inner lower 57 is provided in the above-described extending portion 55, and the lower portion of the pillar inner upper 56 and the upper portion of the pillar inner lower 57 are joined to each other at a plurality of positions along the vehicle longitudinal direction of the extending portion 55 by spot welding or the like (indicated by an "x" in FIG. 8).

As illustrated in FIG. 10, in the closed cross-sectional space 4s of the side sill 4, the pillar front section 22F and the pillar rear section 22R described above are provided on the vehicle width outer side of the extending portion 55, and the pillar front section 22F and the pillar rear section 22R are respectively provided on a front end side of the extending portion 55 and a rear end side of the extending portion 55 in a manner to be separated from each other in the vehicle longitudinal direction.

As illustrated in FIG. 1 and FIG. 2, the vehicle side body structure in this embodiment described above is the vehicle side body structure that includes: the side sill 4 that has the closed cross-sectional space 4s (see FIG. 10) (the closed cross-sectional structure) extending in the vehicle longitudinal direction; the wheel house 90, the front lower portion 92a of which is raised from the rear portion of the side sill 4; the center pillar 5 that has the closed cross-sectional space 5s (the closed cross-sectional structure) (see FIG. 8) extending upward from the intermediate portion of the side sill 4; and the rear side door 6 (see FIG. 2) serving as the door for opening/closing the rear getting-on/off opening 2r that is the opening formed to be opened at the position above the side sill 4 and behind the center pillar 5. As illustrated in FIG. 2, the impact bar 63 is disposed such that, when the rear side door 6 is closed, the rear flange 63r (the rear portion) of the impact bar 63 provided to the rear side door 6 overlaps the rear portion of the side sill 4 in the vehicle side view (that is, in the vehicle width direction). As illustrated in FIG. 3, FIGS. 4A, 4B, FIG. 5, and FIG. 9 to FIG. 11, the side sill 4 includes the first upper reinforcing member 30U as the side sill reinforcing member that reinforces the bending rigidity against the load toward the vehicle width inner side. The first upper reinforcing member 30U is provided in the intermediate portion (the center pillar arrangement region 4Ra) of the side sill 4, in which at least the center pillar 5 is located, in the longitudinal direction of the side sill 4 as illustrated in FIG. 9 to FIG. 11, and is provided in the rear portion of the side sill 4 as illustrated in FIG. 3 and FIG. 11.

With the above configuration, the rear flange 63r of the impact bar 63 provided to the rear side door 6 is disposed to overlap the rear portion of the side sill 4 in the vehicle side view at the time when the rear side door 6 is closed, and the side sill 4 including the rear portion thereof is reinforced by the first upper reinforcing member 30U. Thus, the rear portion of the side sill 4 can securely receive a lateral collision load that is applied to the impact bar 63 of the rear side door 6 during the lateral collision of the vehicle (hereinafter referred to as "during the lateral collision").

Furthermore, since the front lower portion 92a of the rear wheel house 90 is raised from the rear portion of the side sill 4 (see FIG. 1 and FIG. 3), the rear portion of the side sill forms the L-shaped region in the vehicle side view with the front lower portion 92a of the rear wheel house 90 (the rear wheel house outer 92), and the L-shaped region can receive the load that is transmitted from the impact bar 63 to the rear portion of the side sill 4 during the lateral collision while dispersing the load. Just as described, with the rear wheel house 90 as a vehicle body part, the first upper reinforcing member 30U effectively receives the lateral collision load. Thus, compared to a case where the first upper reinforcing member 30U receives the lateral collision load by itself, the structure of the first upper reinforcing member 30U can be simplified. As a result, the weight of the first upper reinforcing member 30U can be reduced.

In summary, with the above configuration, the first upper reinforcing member 30U is at least provided in the intermediate portion (the center pillar arrangement region 4Ra) of the side sill and the rear portion of the side sill 4 in the longitudinal direction of the side sill 4. Thus, it is possible to securely receive the lateral collision load when the lateral collision load is transmitted in the dispersed manner to the intermediate portion (the center pillar arrangement region 4Ra) of the side sill via the center pillar 5 and to the rear portion of the side sill 4 via the impact bar 63.

Therefore, it is possible to improve the bending rigidity of the side sill 4 against the load toward the vehicle width inner side during the lateral collision while suppressing a weight increase of the vehicle body (the side sill 4).

Here, as long as the configuration that the first upper reinforcing member 30U is at least provided in the center pillar arrangement region 4Ra and the rear portion in the longitudinal direction of the side sill 4 is adopted, the first upper reinforcing member 30U may be provided discontinuously such that these center pillar arrangement region 4Ra and rear portion are separated (not illustrated). However, as in the present example, when the first upper reinforcing member 30U is continuously provided from the center pillar arrangement region 4Ra to the rear portion of the side sill 4 along the longitudinal direction of the side sill 4 (see FIG. 11), the first upper reinforcing member 30U can disperse the load, which is transmitted from the impact bar 63 to the rear portion of the side sill 4, from the rear portion of the side sill 4 to the center pillar arrangement region 4Ra during the lateral collision. Thus, such a configuration is preferred in terms of a point that an effect of reinforcing the side sill 4 by the first upper reinforcing member 30U can be enhanced.

Furthermore, in such a case, as in the present example, the configuration that, in the cross-sectional view that is perpendicular to the longitudinal direction of the side sill 4, the first upper reinforcing member 30U is partially provided only to the upper portion corresponding to the height of the center pillar joined portion 4A, to which the center pillar 5 is joined, (see FIG. 5 and FIG. 12) and is thereby continuously provided along the longitudinal direction of the side sill 4 is further preferred in terms of a point that a weight increase of the side sill 4 can be suppressed.

As an aspect of the present invention, the second reinforcing member 31 (the wheel house reinforcing member) that extends upward from the rear portion of the side sill 4 along the rear wheel house 90 is provided, and the second reinforcing member 31 overlaps the first upper reinforcing member 30U in the region where the rear flange 63r (the rear portion) of the impact bar 63 is located in the vehicle side view (that is, in the vehicle width direction) (see FIG. 4A and FIG. 5).

With the above configuration, it is possible to securely receive the lateral collision load that is transmitted from the impact bar 63 to the rear portion of the side sill 4 during the lateral collision by the overlapping portion between the first upper reinforcing member 30U and the second reinforcing member 31.

As an aspect of the present invention, the second reinforcing member 31 is joined to the first upper reinforcing member 30U, and the rear flange 63r of the impact bar 63 overlaps the portion where the second reinforcing member 31 and the first upper reinforcing member 30U are joined to each other in the vehicle side view (see FIG. 3 and FIG. 4A). With the above configuration, it is possible to further securely receive the lateral collision load that is applied to the impact bar 63 of the rear side door 6 during the lateral collision by the rear portion of the side sill 4.

As an aspect of the present invention, the first upper reinforcing member 30U has the ridgeline 35 extending in the vehicle longitudinal direction (see FIG. 5, FIG. 11, and FIG. 12), and the second reinforcing member 31 has the ridgelines 31d, 31e extending in the vertical direction (see FIG. 5 to FIG. 7). The first upper reinforcing member 30U and the second reinforcing member 31 are formed such that the ridgeline 35 extending in the vehicle longitudinal direction and the ridgelines 31d, 31e extending in the vertical direction continue in the vehicle side view (see FIG. 5, FIG. 6, FIG. 11, and FIG. 12).

With the above configuration, since the first upper reinforcing member 30U has the ridgeline 35 extending in the vehicle longitudinal direction, it is possible to further improve the bending rigidity against the load toward the vehicle width inner side of the side sill 4 in the vehicle plan view.

Furthermore, since the second reinforcing member 31 has the ridgelines 31d, 31e extending in the vertical direction, it is possible to further improve the bending rigidity against the load toward the vehicle width inner side of the side sill 4 in the vehicle side view and torsion rigidity around an axis extending in the longitudinal direction of the side sill 4.

Since these ridgelines 35, 31d, 31e are defined to continue in the vehicle side view, it is possible to further improve the bending rigidity of the side sill 4 against the load toward the inner side in the vehicle width direction during the lateral collision.

As an aspect of the present invention, the impact bar 63 overlaps the center pillar 5 in the vehicle side view (that is, in the vehicle width direction) (see FIG. 2).

With the above configuration, when the rear side door 6 is closed, the front flange 63f (the front portion) of the impact bar 63 overlaps the center pillar 5 in the vehicle side view. Accordingly, it is possible to securely transmit the lateral collision load, which is received by the center pillar 5 from a colliding object during the lateral collision, to the rear portion of the side sill 4 via the impact bar 63, and it is also possible to securely transmit the lateral collision load, which is received by the impact bar 63 from the colliding object, to the center pillar arrangement region 4Ra of the side sill 4 via the center pillar 5.

Thus, for example, compared to a configuration that only a region where the center pillar 5 is located or the like is formed to be strong, it is possible to improve the bending rigidity against the load toward the inner side in the vehicle width direction received by the side sill 4 while suppressing the weight increase of the side sill 4.

As an aspect of the present invention, the side sill reinforcing member includes the first upper reinforcing member 30U (the upper reinforcing member) located in the upper portion of the side sill 4 and the first lower reinforcing member 30D (the lower reinforcing member) located in the lower portion of the side sill 4. In the side sill 4, the outer wall bead 42cc is provided in the outer wall 42c that is located in the intermediate portion in the vertical direction between these first upper reinforcing member 30U and first lower reinforcing member 30D (see FIG. 5, FIG. 8, FIG. 9, and FIG. 12).

With the above configuration, it is possible to further improve the bending rigidity of the side sill 4 against the load toward the inner side in the vehicle width direction during the lateral collision.

The present invention is not limited to the configuration in the above-described embodiment, but can be implemented in various embodiments.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

2r: Rear entry and exit opening (opening)
4: Side sill
4Ra: Center pillar arrangement region (intermediate portion of side sill)
4s: Closed cross-sectional space (closed cross-sectional structure)
5s: Closed cross-sectional space
6: Rear side door (door)
30U: First upper reinforcing member (side sill reinforcing member)
30D: First lower reinforcing member (side sill reinforcing member)
31: Second reinforcing member (wheel house reinforcing member)
31d, 31e: Ridgeline extending in vertical direction
35: Ridgeline extending in vehicle longitudinal direction
63: Impact bar
63r: Rear flange (rear portion of impact bar)
90: Rear wheel house (wheel house)
92a: Front lower portion

The invention claimed is:

1. A vehicle side body structure comprising:
a side sill that has a closed cross-sectional structure extending in a vehicle longitudinal direction;
a wheel house, a front lower portion of which is raised from a rear portion of the side sill;

a center pillar that has a closed cross-sectional structure extending upward from an intermediate portion of the side sill; and a door that opens and closes an opening formed to be opened at a position above the side sill and behind the center pillar, wherein an impact bar provided to the door is disposed such that a rear portion thereof overlaps the rear portion of the side sill in a vehicle side view when the door is closed, the side sill includes a side sill reinforcing member that reinforces bending rigidity against a load toward an inner side in a vehicle width direction, and the side sill reinforcing member is at least provided in the intermediate portion of the side sill, in which the center pillar is located, and the rear portion of the side sill in a longitudinal direction of the side sill.

2. The vehicle side body structure according to claim 1, further comprising:

a wheel house reinforcing member that extends upward from the rear portion of the side sill along the wheel house, wherein the wheel house reinforcing member overlaps the side sill reinforcing member in or adjacent a region where a rear portion of the impact bar is located in the vehicle side view.

3. The vehicle side body structure according to claim 2, wherein the wheel house reinforcing member is joined to the side sill reinforcing member, and the rear portion of the impact bar overlaps a joined portion between the wheel house reinforcing member and the side sill reinforcing member in the vehicle side view.

4. The vehicle side body structure according to claim 2, wherein the side sill reinforcing member and the wheel house reinforcing member have a ridgeline extending in the vehicle longitudinal direction and a ridgeline extending in a vertical direction, respectively, and the ridgeline extending in the vehicle longitudinal direction and the ridgeline extending in the vertical direction are defined to continue in the vehicle side view.

5. The vehicle side body structure according to claim 3, wherein the side sill reinforcing member and the wheel house reinforcing member have a ridgeline extending in the vehicle longitudinal direction and a ridgeline extending in a vertical direction, respectively, and the ridgeline extending in the vehicle longitudinal direction and the ridgeline extending in the vertical direction are defined to continue in the vehicle side view.

6. The vehicle side body structure according to claim 1, wherein the impact bar overlaps the center pillar in the vehicle side view.

7. The vehicle side body structure according to claim 2, wherein the impact bar overlaps the center pillar in the vehicle side view.

8. The vehicle side body structure according to claim 3, wherein the impact bar overlaps the center pillar in the vehicle side view.

9. The vehicle side body structure according to claim 4, wherein the impact bar overlaps the center pillar in the vehicle side view.

10. The vehicle side body structure according to claim 5, wherein the impact bar overlaps the center pillar in the vehicle side view.

11. The vehicle side body structure according to claim 1, wherein the side sill reinforcing member has an upper reinforcing member located in an upper portion of the side sill and a lower reinforcing member located in a lower portion of the side sill, and in the side sill, an outer wall bead is provided in an outer wall that is located in an intermediate portion between the upper reinforcing member and the lower reinforcing member in the vertical direction.

12. The vehicle side body structure according to claim 2, wherein the side sill reinforcing member has an upper reinforcing member located in an upper portion of the side sill and a lower reinforcing member located in a lower portion of the side sill, and in the side sill, an outer wall bead is provided in an outer wall that is located in an intermediate portion between the upper reinforcing member and the lower reinforcing member in the vertical direction.

13. The vehicle side body structure according to claim 3, wherein the side sill reinforcing member has an upper reinforcing member located in an upper portion of the side sill and a lower reinforcing member located in a lower portion of the side sill, and in the side sill, an outer wall bead is provided in an outer wall that is located in an intermediate portion between the upper reinforcing member and the lower reinforcing member in the vertical direction.

14. The vehicle side body structure according to claim 4, wherein the side sill reinforcing member has an upper reinforcing member located in an upper portion of the side sill and a lower reinforcing member located in a lower portion of the side sill, and in the side sill, an outer wall bead is provided in an outer wall that is located in an intermediate portion between the upper reinforcing member and the lower reinforcing member in the vertical direction.

15. The vehicle side body structure according to claim 5, wherein the side sill reinforcing member has an upper reinforcing member located in an upper portion of the side sill and a lower reinforcing member located in a lower portion of the side sill, and in the side sill, an outer wall bead is provided in an outer wall that is located in an intermediate portion between the upper reinforcing member and the lower reinforcing member in the vertical direction.

16. The vehicle side body structure according to claim 6, wherein the side sill reinforcing member has an upper reinforcing member located in an upper portion of the side sill and a lower reinforcing member located in a lower portion of the side sill, and in the side sill, an outer wall bead is provided in an outer wall that is located in an intermediate portion between the upper reinforcing member and the lower reinforcing member in the vertical direction.

17. The vehicle side body structure according to claim 7, wherein the side sill reinforcing member has an upper reinforcing member located in an upper portion of the side sill and a lower reinforcing member located in a lower portion of the side sill, and in the side sill, an outer wall bead is provided in an outer wall that is located in an intermediate portion between the upper reinforcing member and the lower reinforcing member in the vertical direction.

18. The vehicle side body structure according to claim 8, wherein the side sill reinforcing member has an upper reinforcing member located in an upper portion of the side sill and a lower reinforcing member located in a lower portion of the side sill, and in the side sill, an outer wall bead is provided in an outer wall that is located in an intermediate portion between the upper reinforcing member and the lower reinforcing member in the vertical direction.

19. The vehicle side body structure according to claim 9, wherein the side sill reinforcing member has an upper reinforcing member located in an upper portion of the side sill and a lower reinforcing member located in a lower portion of the side sill, and in the side sill, an outer wall bead is provided in an outer wall that is located in an intermediate portion between the upper reinforcing member and the lower reinforcing member in the vertical direction.

20. The vehicle side body structure according to claim 10, wherein the side sill reinforcing member has an upper reinforcing member located in an upper portion of the side sill and a lower reinforcing member located in a lower portion of the side sill, and in the side sill, an outer wall bead is provided in an outer wall that is located in an intermediate portion between the upper reinforcing member and the lower reinforcing member in the vertical direction.

\* \* \* \* \*